United States Patent [19]

Bayer et al.

[11] Patent Number: 4,714,358
[45] Date of Patent: Dec. 22, 1987

[54] CAGE FOR LIPLESS ROLLER BEARINGS

[75] Inventors: Oswald Bayer, Aidhausen; Martin Grehn; Werner Planek, both of Dittelbrunn, all of Fed. Rep. of Germany

[73] Assignee: FAG Kugelfischer Georg Schafer (KGaA), Fed. Rep. of Germany

[21] Appl. No.: 823,260

[22] Filed: Jan. 28, 1986

[30] Foreign Application Priority Data

Feb. 7, 1985 [DE] Fed. Rep. of Germany ....... 3504059

[51] Int. Cl.[4] .............................................. F16C 33/48
[52] U.S. Cl. ...................................... 384/470; 384/571
[58] Field of Search ............... 384/470, 568, 572, 576, 384/571, 580

[56] References Cited

U.S. PATENT DOCUMENTS

| | | |
|---|---|---|
| 1,283,713 | 11/1918 | Fjellman . |
| 2,554,957 | 5/1951 | Riblet .................... 384/571 |
| 2,611,670 | 9/1952 | Palmgren ............... 384/577 |
| 3,388,952 | 6/1968 | Schaeffler .............. 384/576 |
| 3,476,454 | 11/1969 | Markey . |
| 3,940,193 | 2/1976 | Molloy . |
| 4,522,516 | 6/1985 | Neese ..................... 384/572 |

FOREIGN PATENT DOCUMENTS

| | | |
|---|---|---|
| 465535 | 9/1928 | Fed. Rep. of Germany . |
| 936729 | 12/1955 | Fed. Rep. of Germany . |
| 1053881 | 9/1959 | Fed. Rep. of Germany . |
| 2416320 | 11/1974 | Fed. Rep. of Germany . |

*Primary Examiner*—Lenard A. Footland
*Attorney, Agent, or Firm*—Ostrolenk, Faber, Gerb & Soffen

[57] ABSTRACT

A cage for lipless roller bearings, in which two rows of bearings are separated and supported by a support ring that is wedge- or cusp-shaped in cross-section at the longitudinally inward ends of the roller rows. The support ring surfaces facing the roller ends are so shaped (e.g. having a surface that is inclined to the roller end, or having a larger radius of curvature than the curved roller end, with the axes of curvature being placed inward of the roller axes) that there is defined a lubrication-receiving space between the support ring and the ends of the supported rollers which increases in width toward the radial interior of the bearing, to improve lubrication characteristics. Advantageously the cage may be used with a lipless self-aligning roller bearing, or a lipless conical or tapered roller bearing.

6 Claims, 2 Drawing Figures

CAGE FOR LIPLESS ROLLER BEARINGS

BACKGROUND OF THE INVENTION

1. Field of the Invention

The present invention relates to a cage for lipless roller bearings, and more particularly to a two-row bearing in which rollers are separated by wedge- or cusp-shaped support members in a supporting area of the cage.

2. Description of the Related Art

An example of a cage for lipless roller bearings is seen, for example, in U.S. Pat. No. 2,611,670. In that patent, the rows of rollers of a two-row self-aligning bearing rest against surfaces of an inner separator in the cage that are substantially parallel to each other. It is apparently acceptable for the rollers to rest against a separator having such parallel resting surfaces when their axial components of motion are taken up by a central lip on the inner ring. However, if such a lip is absent, such a separator is unacceptable, since a sufficient lubricating film for the forces which occur cannot build up on the opposite parallel surfaces. There is increased friction and as a result rapid heating of the bearing, which can lead to an early failure of the bearing.

In Federal Republic of Germany Pat. No. 46 55 35, a roller bearing is shown in which a window cage has certain sections which are inclined at a slight angle to the roller end surfaces, rather than being parallel thereto. In that case, however, the bearing is only a single-row bearing. Furthermore, the wedge surfaces do not extend over the entire supporting area of the cage, which moreover is relatively small. For these reasons the problem of insufficient lubrication is not alleviated.

SUMMARY OF THE INVENTION

An important object of the present invention is therefore to provide an improved cage for lipless roller bearings which can apply axial supporting forces to the rollers with acceptably low friction, to eliminate the necessity of a central lip on the inner ring.

A further object is to improve the support of the rollers to more accurately control their disposition.

According to one aspect of the invention, a cage is provided for a lipless roller bearing, comprising support means for supporting an end of each roller. The support means has a radially outward portion which is disposed toward the outer race of the bearing, a radially inwardly portion, and side portions extending radially between the outward and inward portions, which oppose the supported ends of the rollers and define a lubrication-receiving space, between the support means and each supported roller end, which widens with distance from the outward portion toward the interior of the bearing. Advantageously, the support means may have a substantially continuous side for supporting an end of more than one such roller.

According to another aspect of the invention, a cage is provided for a lipless roller bearing having a plurality of rollers, comprising a support ring for supporting an end of each roller. The support ring has a radially outward portion which is disposed toward the outer race of the bearing, a radially inward portion, and a side extending between the outward and inward portions which defines a lubrication-receiving space, between the support ring and the corresponding roller ends, which widens with distance from the radially outward portion toward the interior of the bearing.

According to a further aspect, the support ring side and the corresponding roller ends have planar surfaces, and these surfaces define an angle. Advantageously, this angle may be about 10' to 30°.

According to another aspect, a cage is provided for a lipless roller bearing having two rows of rollers. One end of each of the rollers is supported by a support ring, which is disposed between the two rows of rollers. The support ring has two sides extending between its radially outward and inward portions which define lubrication-receiving spaces, between the support ring and the corresponding roller ends, which widen with distance from the radially outward portion toward the interior of the bearing.

In another aspect of the invention the supported ends of the rollers and the corresponding sides of the support ring are curved. Advantageously, the radii of curvature of the ends may be smaller than the radius of curvature of the corresponding support ring side, and the center of curvature of the support ring side may be located radially inward of the longitudinal axes of the rollers.

According to additional aspects of the invention, such a cage is adapted for use in a lipless self-aligning roller bearing, or a lipless conical or tapered roller bearing.

Since the force-transmitting surfaces of the support ring and each roller end oppose each other at a small angle, a hydrodynamic lubricating film can build up between them, even at low speeds of rotation. Thus, heating is substantially avoided. Since the support ring extends approximately up to the outer bearing race, a large space is obtained to develop this hydrodynamic bearing. By the rotation of the rollers around their axes, lubricant is additionally forced, at least on one side, into the narrowing clearance. This effect is further supported by centrifugal force.

In the possible event of the rollers moving to an oblique position, wherein the longitudinal axes of the rollers move with respect to the bearing races, no substantial change in the geometry of the hydrodynamic clearance takes place. Furthermore, if a roller skews, or twists about a line perpendicular to its longitudinal axis, the point of contact travels along the edge of the end surface, thus gradually increasing the effective lever arm of the restoring force. The rollers can therefore slip a small amount without a great restoring force being required, and thus assume their ideal angle of twist under load.

It is also advantageous that no flanges or edges are present which could scrape off the lubricant.

The most favorable lubricating conditions between the cage support ring and the roller end surfaces are found to be obtained when the angle a (FIG. 1) is between 10' and 3°.

Other objects, features, and advantages of the invention will be seen from the following detailed description of preferred embodiments, with reference to the accompanying drawings.

DETAILED DESCRIPTION OF PREFERRED EMBODIMENTS

Figure 1:
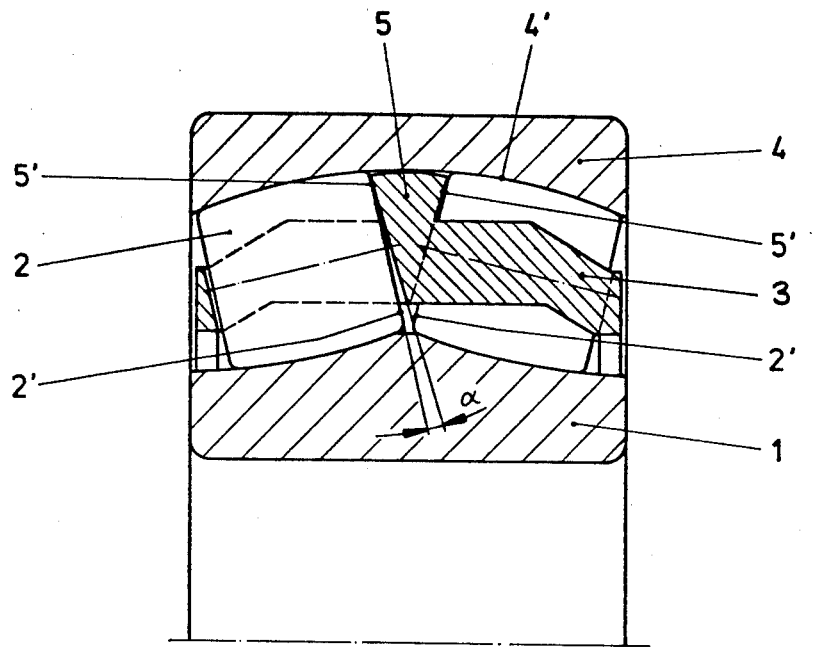
FIG. 1 is a partial cross-section through a self-aligning roller bearing wherein the support ring sides and the roller ends are planar surfaces.

A self-aligning roller bearing comprises, as shown in FIG. 1, an inner ring 1, two rows of rollers 2, a cage 3 and an outer ring 4. The cage 3 has the form of a window cage and includes a support ring 5 between the rollers 2 which extends up to near the race 4' of the outer ring 4. Both of the axial side surfaces 5' of the member 5 are inclined at an angle a with respect to the flat end surfaces 2' of the rollers 2. In this way, a hydrodynamic lubricating film with substantially reduced friction can build up in the spaces between the support ring 5 and the respective opposed ends of the rollers. Furthermore, the rollers are supported mainly at a single point in the region of the radially outward surface of the rollers 2, i.e. in the region of the outer race, at the part of the roller then near the outer race. This creates an instability in the supporting forces on the rollers, which is desirable when a small degree of twist of the rollers 2 is desired.

Figure 2:
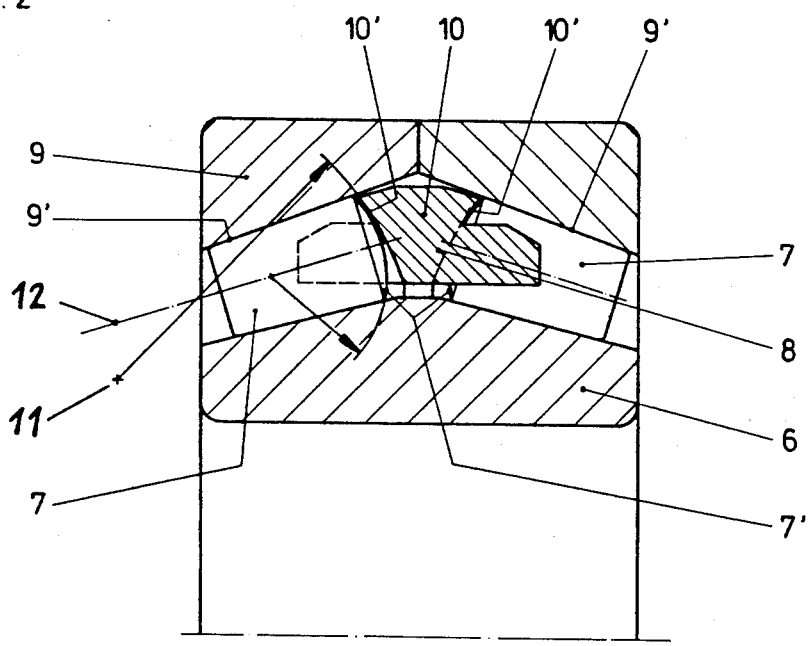
FIG. 2 is a partial cross-section through a conical roller bearing wherein the support ring sides and the roller ends are curved surfaces.

The two-row conical roller bearing shown in FIG. 2 comprises an inner ring 6, two rows of conical or tapered rollers 7, a double crest cage 8 and a bipartite outer ring 9. The rollers 7 have convexly curved end surfaces 7', which are disposed opposite the respective side surfaces 10' of the support ring 10, which are correspondingly concavely curved. The radius of curvature of the end surfaces 7' of the rollers 7 is smaller than the radius of curvature of the side surfaces 10' of the support ring 10, and the center of curvature 11 of the side surface 10' lies within the longitudinal axis 12 of the roller toward the interior of the bearing, and far enough inward that the locations of contact between the facing surfaces 7' and 10' are at the parts of the rollers then in the region of the races 9' of the outer ring 9, accomplishing the same result as in the first embodiment.

Although the invention has been described herein with reference to preferred embodiments thereof, it is to be understood that the invention is not limited to such embodiments. Rather, variations and modifications of the invention may occur to one skilled in the art within the scope of the invention, as defined by the claims.

What is claimed is:

1. A cage for a lipless roller bearing having a plurality of rollers therein, the cage comprising
   a support ring for supporting an end of each roller; the support ring having
   a radially outward portion which is disposed toward the outer race of the bearing;
   a radially inward portion;
   side portions extending radially between the outward and inward portions, which oppose the supported ends of the rollers and define a lubrication-receiving space, between the support means and each supported roller end, which widens with distance from the outward portion toward the interior of the bearing; and
   a substantially continuous side for supporting an end of more than one such roller; the support ring side and the corresponding opposed supported roller ends having substantially planar surfaces;
   wherein said planar surfaces define an angle therebetween of about 10' to 3°.

2. A cage as in claim 1, wherein the supported ends of the rollers and the opposed support ring side have curved surfaces,
   the radii of curvature of the ends being smaller than the radius of curvature of the support ring side, and
   the center of curvature of the support ring side being located within the longitudinal axes of the corresponding rollers, toward the interior of the bearing.

3. A cage as in claim 1, wherein the cage is for a lipless roller bearing having two rows of rollers therein;
   said support means being disposed between said two rows;
   one end of each roller in said two rows being supported by said side portions of said support means; and
   said side portions opposing said supported ends of the rollers and defining a lubrication-receiving space, between the support means and each supported roller end, which widens with distance from the outward portion of the support means toward the interior of the bearing.

4. A lipless roller bearing, comprising:
   (a) outer ring means having a surface defining an outer bearing race;
   (b) inner ring means having a surface defining an inner bearing race;
   (c) a plurality of rollers disposed between said outer and inner bearing races for making rolling contact with said two races;
   (d) a cage between said two races for locating said rollers with respect to one another, the cap including
      (i) a support ring for supporting an end of each roller;
      (ii) the support ring having a radially outward portion which is disposed toward the outer race of the bearing; a radially inward portion; side portions extending radially between the outward and inward portions, which oppose the supported ends of the rollers and define a lubrication-receiving space between the support means and each supported roller end, which widens with distance from the outward portion toward the interior of the bearing; and a substantially continuous side for supporting an end of more than one such roller; the support ring side and the corresponding opposed supported roller ends having substantially planar surfaces;
      wherein said planar surfaces define an angle therebetween of about 10' to 3°.

5. A bearing as in claim 4, wherein the supported ends of the rollers and the opposed support ring side have curved surfaces,
   the radii of curvature of the ends being smaller than the radius of curvature of the support ring side, and
   the center of curvature of the support ring side being located within the longitudinal axes of the corresponding rollers, toward the interior of the bearing.

6. A bearing as in claim 4, wherein the bearing has two rows of rollers therein;
   said support means being disposed between said two rows;
   one end of each roller in said two rows being supported by said side portions of said support means; and
   said side portions opposing said supported ends of the rollers and defining a lubrication-receiving space, between the support means and each supported roller end, which widens with distance from the outward portion of the support means toward the interior of the bearing.

* * * * *